United States Patent [19]

Summerlin

[11] Patent Number: 4,988,247
[45] Date of Patent: Jan. 29, 1991

[54] BLIND RIVET AND METHOD OF MAKING SAME

[76] Inventor: Frederick A. Summerlin, The Carriage House, Alston Hall,, Holbeton, Plymouth, Devon PL8 1HL, United Kingdom

[21] Appl. No.: 519,123

[22] Filed: May 4, 1990

[30] Foreign Application Priority Data

May 16, 1989 [GB] United Kingdom ............... 8911218

[51] Int. Cl.$^5$ ............................................. F16B 13/04
[52] U.S. Cl. ....................................... 411/38; 411/43; 411/69
[58] Field of Search ................................... 411/34–38, 411/43, 55, 69, 70

[56] References Cited

U.S. PATENT DOCUMENTS

| 2,030,166 | 2/1936 | Huck | 411/34 |
| 2,030,171 | 2/1936 | Huck | 411/34 |
| 2,397,111 | 3/1946 | Huck | 411/43 |
| 3,286,580 | 11/1966 | Jeal | 411/34 |
| 4,312,613 | 1/1982 | Binns | 411/34 |

Primary Examiner—Neill R. Wilson
Attorney, Agent, or Firm—Thomas J. Greer, Jr.

[57] ABSTRACT

A self-plugging blind rivet comprises a tubular shell shank having a preformed radially enlarged head at one end a region of increased diameter and hardness at the tail end, adjacent the head of the stem. The rivet is formed by compressing the stem and a plain cylindrical shell in a die having a portion of enlarged bore diameter at the tail end region, whereby the shell is expanded into the enlarged bore portion with resulting work hardening.

6 Claims, 3 Drawing Sheets

U.S. Patent    Jan. 29, 1991    Sheet 1 of 3    4,988,247
FIG. 1
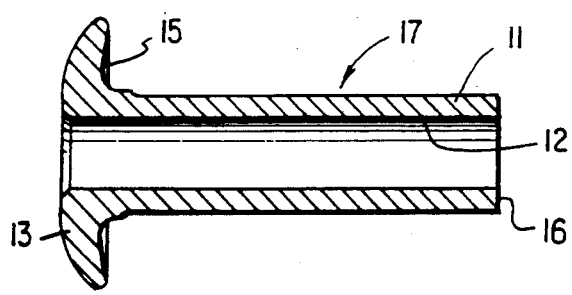
FIG. 2
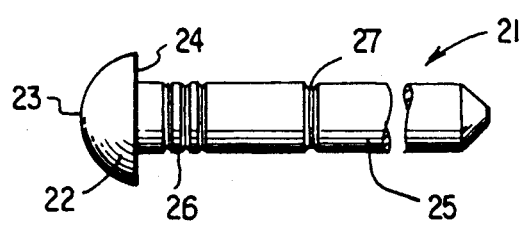
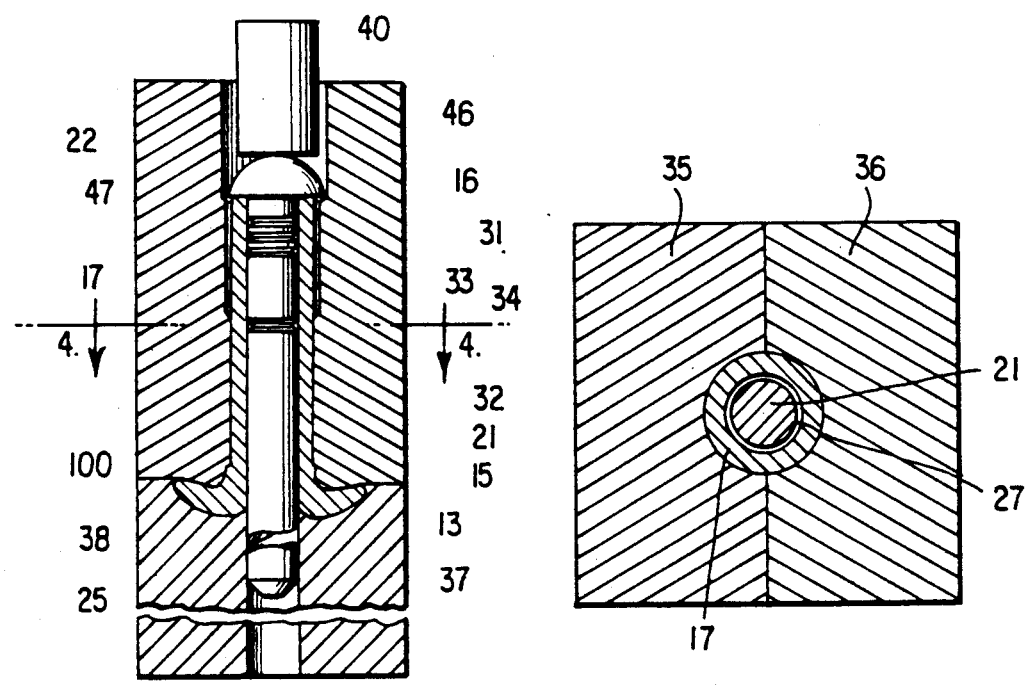
FIG. 3    FIG. 4

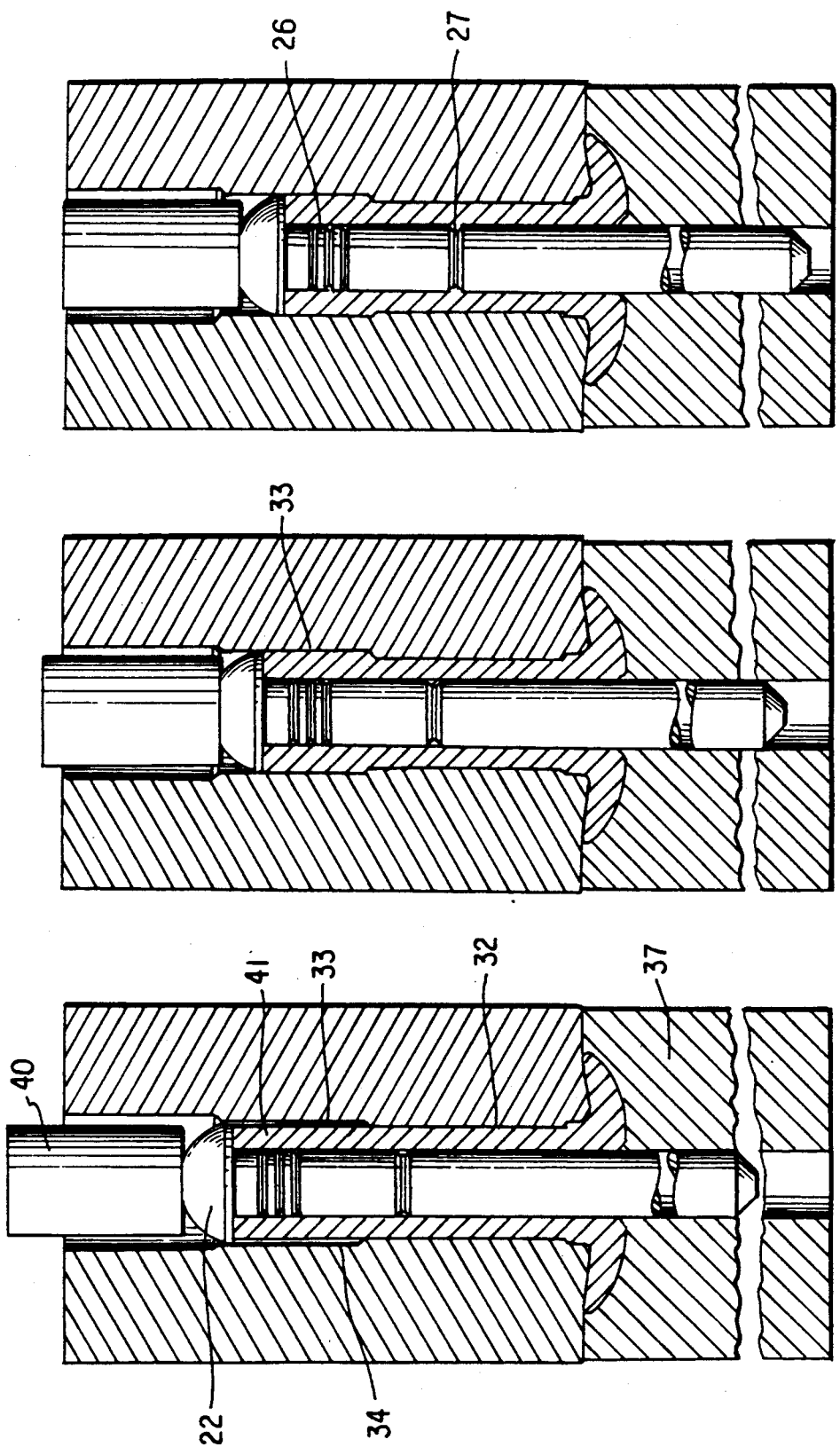

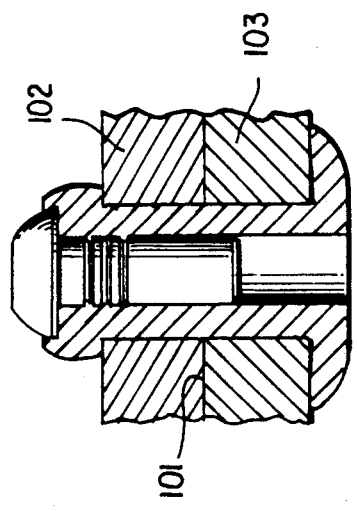
FIG. 13
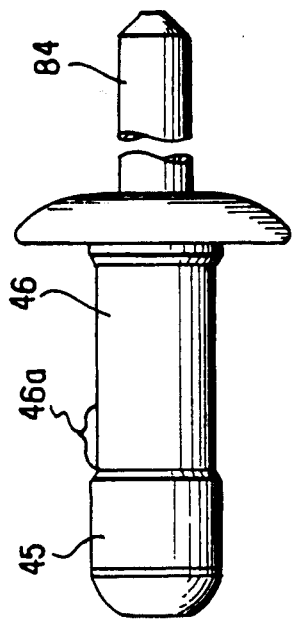
FIG. 8
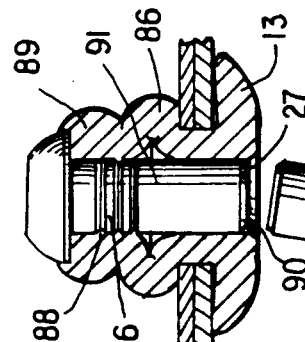
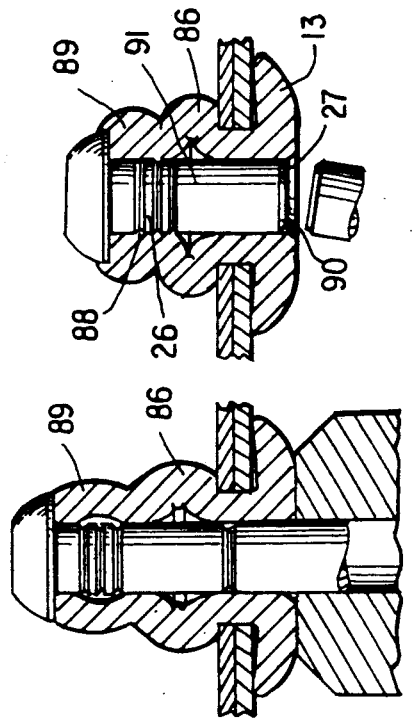
FIG. 12
FIG. 11
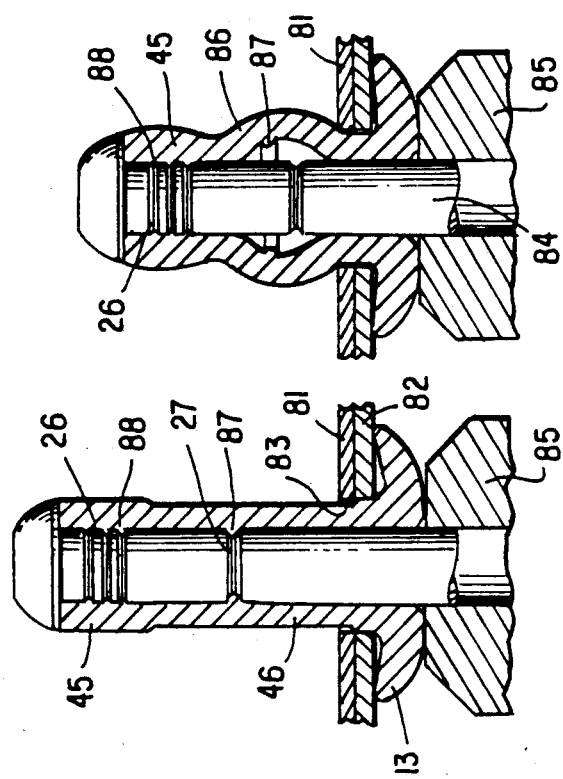
FIG. 10
FIG. 9

BLIND RIVET AND METHOD OF MAKING SAME

The invention relates to a blind rivet. A blind rivet is one which can be inserted and set by access to one side only of apertured members to be riveted together.

More particularly the invention relates to a self-plugging blind rivet comprising a tubular shell having a preformed radial head at one end, and a stem extending through the tubular shell and having a stem head adjacent the tail end of the shell. In use, the rivet is inserted, shell tail end first, through the apertures in the members to be riveted until the preformed shell head contacts the nearer member and the shell tail end protrudes beyond the further member. In order to set the rivet, the shell head is supported by an abutment and the stem is then pulled so that the stem head compresses the shell against the abutment and causes axial contraction of the shell and radial expansion of at least part thereof to form a blind head which, together with the preformed head, clamps the members together. At least part of the stem adjacent its head is retained within the shell to plug the latter after the rivet has been set. The remainder of the stem (i.e. the tail end remote from the head thereof) is preferably broken off to avoid protrusion from the shell head.

Such self-plugging blind rivets are well known and widely used. In practice it is highly desirable for the set rivet to exhibit a number of different advantageous characteristics, e.g. wide grip range (the range of total thicknesses of members over which identical rivets will perform satisfactorily); good clench characteristics (the ability to pull together members which are initially separated); hole fill (the ability to fill the holes in the sheet); high shear strength; good stem retention; high tension strength of the set rivet throughout the grip range; and no protrusion of the retained portion of the stem from the preformed head of the set rivet.

These characteristics involve different design features, some of which are mutually conflicting. The present invention seeks to provide a rivet which meets these desirable characteristics and which is simple and easy to manufacture. In order to obtain wide grip range the rivet must form a satisfactory blind head in a position which is in contact with the back sheet in minimum grip and also provide a satisfactory blind head in thicker sheets right up to the maximum grip. A good blind head is essential if high tension strength is to be attained. Good stem retention needs to be achieved by positive interlocking of stem and shell when the rivet is placed, not only to prevent the stem from falling out and spoiling the appearance of the rivet but also to assist in making the joint watertight. Hole fill can be attained by ensuring that the shank of the rivet is comparatively soft so that during installation the shank of the rivet shortens and expands to fill the hole. This effect also contributes to good clench characteristics. If high shear strength is to be maintained, the retained part of the stem in the set rivet must lie within the riveted members and across their cleavate or contact plane. In turn, if at the same time the retained part of the stem is not to protrude beyond the preformed shell head, the total length of the set rivet must vary little throughout the grip range.

The invention provides, in one of its aspects, a self-plugging blind rivet for securing together apertured members, the rivet comprising a tubular shell having a shank, a tail end face at one end of the shank and a preformed radially enlarged head at the other end of the shank, and a stem which extends through the shell and has a stem head adjacent the tail end face of the shank, in which the shell shank has an increased outside diameter in a tail end region thereof and the material in this region is harder than the material of the shank in a region adjacent the preformed radially enlarged head, whereby, in use and under axial compression loading of the shell shank, the shank initially buckles in said region adjacent the preformed head to form a blind head in contact with the apertured member remote from the shell head so as to clamp together the said apertured members.

According to another aspect of the invention, a method is provided of assembling a rivet comprising a tubular rivet shell having a hollow shank with a preformed radially enlarged head at one end thereof and a stem which has a head of larger diameter than the rivet shank, the method comprising inserting the stem in the rivet shank so that the stem head is adjacent to the tail end face of the shank, placing the rivet and stem in a die which carries a bore which fits closely the shank in a region adjacent the head but which is enlarged in a region adjacent the tail of the shank, and applying a compressive force between the head of the rivet shell and the stem head, whereby at least the tail end region of the shank is expanded to fill the die and to produce a large diameter portion at a tail end region of the shank, the said portion being harder than the rivet shank adjacent the preformed shank head.

In practice, under compression a certain amount of extrusion down the rivet shank into the smaller part of the bore will take place, to fill any voids between shank and stem and to form a hard zone intermediate the enlarged tail end region and shank head.

Preferably the diameter of the enlarged region of the shank is exactly equal to the diameter of the stem head. To this end the enlarged region of the die bore should have the same diameter as the stem head, although this may be difficult to achieve in practice. Consequently it is preferable that the stem head is slightly larger than the enlarged region of the die bore so that when the rivet and stem are assembled in the die the compressive force between the head of the rivet shank and the stem head forces the stem head into the enlarged region of the die bore, thereby sizing the stem head to the exact diameter of the enlarged die bore and, hence, the diameter of the tail end region of the shank.

Preferably, there is provided on the shank of the stem a region of reduced diameter, or breakneck, spaced away from the stem head so that, during the assembly of the rivet, the region of reduced diameter on the stem may be filled with material from the shank to further stiffen the rivet shank and increase the tendency for the shank to buckle adjacent the preformed head and to reduce the difference in rivet height when placed in the minimum or maximum grip, so that when the stem breaks at the breakneck the portion of the stem retained in the rivet extends through the major part of the rivet shank so as to contribute to the rivet shear strength across the grip range.

Embodiments of the invention will now be described by way of example and with reference to the accompanying drawings, in which:

FIG. 5 is similar to FIG. 3 but shows the assembly operation partly completed;

FIG. 6 is similar to FIG. 5 but shows a further stage in the assembly operation;

FIG. 7 is similar to FIG. 6 but shows the assembly operation fully completed;

FIG. 8 shows the assembled rivet removed from the die;

FIGS. 9, 10, 11 and 12 show respectively successive stages of deformation of the rivet of FIG. 8, in use to join together two members at the lower end of the grip range; and FIG. 13 corresponds to FIG. 12 but shows the rivet of FIG. 8 fully set to fasten two members together at the upper end of the grip range.

Figure 1:
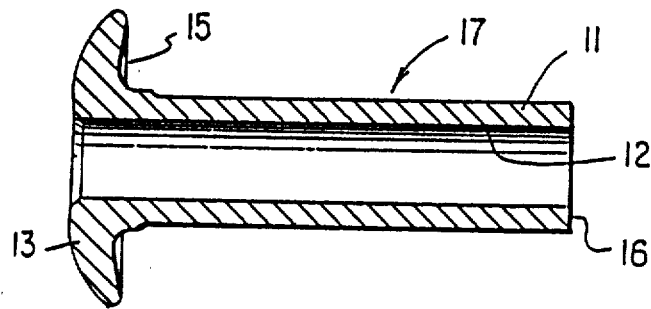
FIG. 1 is a longitudinal section through the shell of the rivet, before assembly.

Referring firstly to FIG. 1, the shell 17 comprises a tubular shank 11 having a concentric cylindrical bore 12 and at one end a radially enlarged head 13. The tail end 16 of the shell is flat and at right angles to the shell axis.

Figure 2:
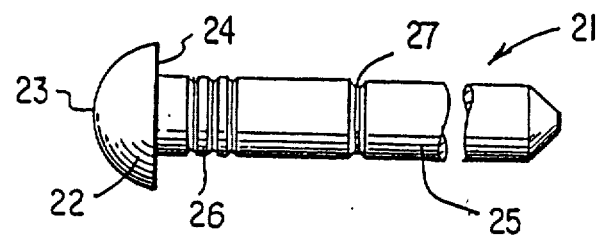
FIG. 2 is a side elevation of the stem of a rivet, before assembly.

The stem 21 shown in FIG. 2 is elongate and generally cylindrical. At one end it has an integral radially enlarged head 22 which has a convex face 23 directed away from the stem shank 25 and a flat annular face 24 directed towards the stem shank. The diameter of the stem head is somewhat larger than the diameter of the shank of the shell 11. Immediately adjacent to the stem head a series of shallow grooves 26 are formed on the stem shank 25, the axial length of these grooves being approximately equal to the diameter of the stem shank. Spaced farther away from the stem head is a deeper groove 27, which constitutes a breakneck which determines the position at which the stem breaks when the rivet is placed.

Figures 3, 4:
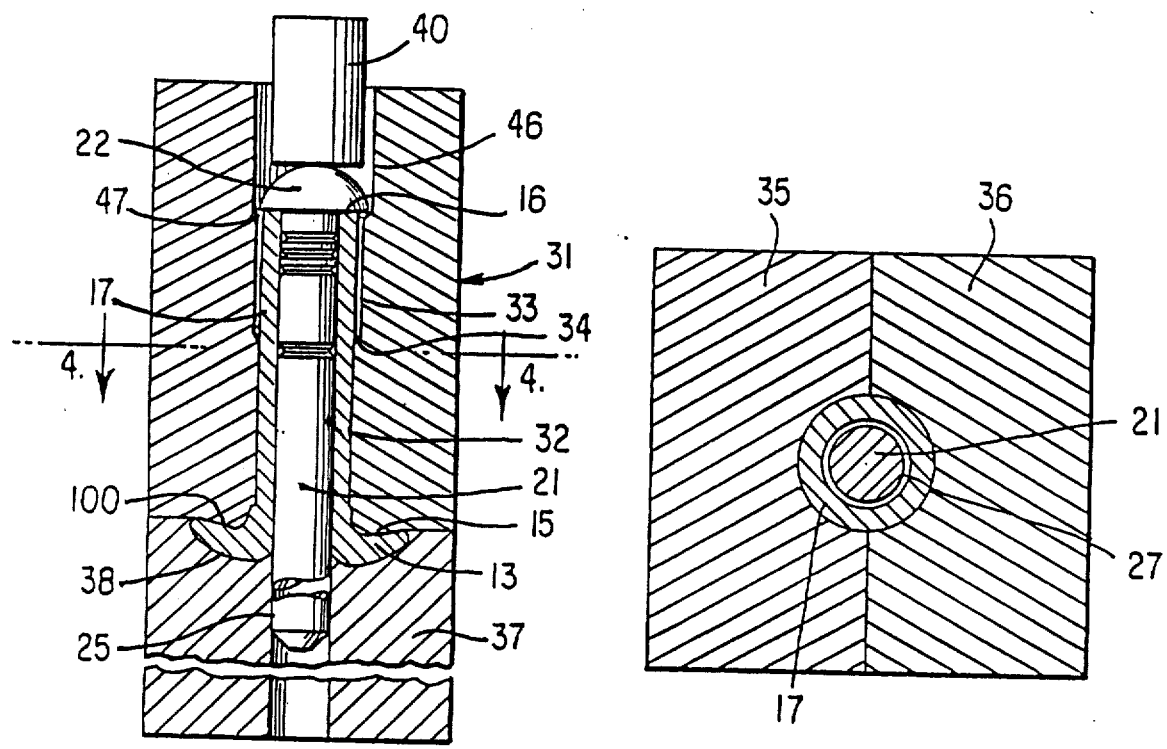
FIG. 3 is a sectional elevation of a rivet shell threaded on a stem and placed in a die to carry out the assembly operation.
FIG. 4 is a section along the lines 4—4 of FIG. 3.

FIG. 3 shows the stem 21 threaded through the shell 17 and placed in a die 31. Stem 21 is a close fit in the shell bore 12 and the rivet shank 11 is similarly a close fit in the lower part 32 of the bore of the die. The upper part of the die 31 has two sections of larger diameter. The section 33 has a diameter slightly smaller than the stem head and the section 46 a diameter slightly larger than the stem head. Bore 46 is joined to bore 33 by means of angled face 47 and bore 33 is joined to the small bore 32 by angled face 34. In this example both face 34 and face 47 have included angles of 60 degrees. Die 31 is split into two parts 35 and 36 as shown in FIG. 4 to enable the rivet parts to be placed in the die and the assembled rivet to be removed. When the rivet is placed in the die before assembly the end 16 of the rivet shank just protrudes through the angled face 47 and the stem head 22 lies within bore 46. During rivet assembly the two parts of the die are held firmly together and in line by means of a clamp (not shown). The rivet head 13 is supported by an anvil 37 which has a central bore which is a sliding fit on the stem shank 25 and which has a recess 38 which closely conforms to the rivet head 13. It is preferable that anvil 37 is urged towards die 31 so that the face 15 of the rivet head 13 is kept in contact with the face of the die 100. The larger bore 46 carries a punch 40 which contacts the stem head 22.

When the rivet is assembled, punch 40 is urged towards anvil 37. Since the part of the rivet shank 65 which lies within the lower part 32 of the die bore is supported because of its close fit, the part of the rivet shank which lies within the upper parts of the die 33 and 46 starts to collapse as shown in FIG. 5. When this occurs the stem head 22 enters the bore 33 and its diameter is sized to the diameter of bore 33. At the same time the angled face 34 supports the collapsed portion 41 which compresses axially to fill the large bore 33 as shown in FIG. 6. When the large bore 33 is substantially full application of further force between anvil 37 and punch 40 extrudes material from the large diameter 33 past the angled face 34 and into the smaller bore 32, compressing the material in the smaller bore and causing it to flow into any voids in that region. These voids principally comprise the breakneck 27, shallow grooves 26, any clearances between the shank of the rivet and the die bore 32 and any clearance between the stem shank and rivet bore 12. This situation is shown in FIG. 7.

The completed assembly of rivet shell 17 and stem 21 is shown in FIG. 8. In this example the shell 17 is manufactured from an aluminum alloy containing a nominal 2% magnesium. The stem 21 is made of cold drawn mild steel. Due to the cold working which has taken place the enlarged end 45 of the rivet is substantially harder than the major part 46 of the shank of the rivet except for the short length 47 which has been extruded from the enlarged end and is slightly harder than the enlarged end. The length of the region 47a is determined by the volume of the voids previously mentioned.

On a particular rivet sample the following hardness readings were obtained:

Enlarged end (45)-70 (HV 2.5)
Extruded portion (47a)-74 (HV 2.5)
Major part (46)-61 (HV 2.5)

The proportions of the rivet are as follows:

The diameter of the enlarged portion 45 of the shank is approximately 1.1 times the smaller shank diameter 46, the length of the enlarged portion 45 is approximately equal to the smaller shank diameter and the length of the hard extruded section 47 is approximately 0.25 times the shank diameter.

FIG. 9 shows an assembled rivet inserted in a hole 83 in two sheets 81, 82 to be riveted together. Shallow grooves 26 are filled with material 88 which has flowed into them from the enlarged end 45 and breakneck 27 is filled with material 87 from the major part of the shank 46. The hole 83 is of such a diameter that it will just allow the enlarged part of the rivet shank 45 to pass through it. The rivet is inserted until the shell head 13 contacts the nearer sheet 82. A suitable pulling tool is then applied to the projecting part 84 of the rivet stem in order to pull the stem in to the shell and set the rivet. Such rivet pulling or placing tools are well known in the art of blind riveting, and essentially such a tool comprises a body having at one end an annular anvil for abutting the rivet shell head, gripping means such as a pair of jaws for gripping the pulling portion of the rivet stem when inserted through the annular anvil, and a pulling device such as pneumatic or hydro-pneumatic piston and cylinder arrangement for retracting the jaws with respect to the anvil. In FIGS. 9 to 11 of the accompanying drawings, only the anvil 85 is indicated, since the rest of the placing tool used is conventional and forms no part of the invention.

As shown in FIG. 10 when the projecting part of the stem shank 84 is first pulled relative to anvil 85 the softer part 46 of the rivet shank begins to form a bulb 86 adjacent to sheet 81 and draws the sheets together. At this stage the enlarged end of the rivet shank 45 is not deformed to any appreciable extent although slight bulbing may cause material 88 to move slightly away from shallow grooves 26. Material 87 which contributed to the stiffness of shank 46 has now moved out of groove 27 and does not contribute any further to the placing process.

FIG. 11 shows a slightly later stage in the placing sequence. Bulb 86 is now firmly seated against sheet 81 and a secondary bulb 89 begins to form in enlarged end 45.

In FIG. 12 the rivet is fully placed. Shank 84 has now fractured at break neck 27 and 91, the remaining part of stem 21, is retained within the rivet bore. Bulb 86 is fully closed and bulb 89 has been enlarged by axial compression so that grooves 26 are once more filled by material 88 and serve to lock the remaining part of the stem 91 within the rivet body. Part 91 has now been moved towards the rivet head so that its end 90 is just below the surface of the rivet head 13.

FIG. 13 shows the rivet placed in conditions of near maximum grip. Bulb 86 of FIG. 12 does not form because it is inhibited by the thicker sheets 102 and 103 and bulb 89 constitutes the tail. The end 90 of the retained part of the stem 91 is now within the rivet bore but contributes to shear strength since it lies across the contact plane 101 of sheets 102 and 103.

I claim:

1. A self-plugging blind rivet for securing together apertured members, the rivet comprising a tubular shell having a shank, a tail end face at one end of the shank and a preformed radially enlarged head at the other end of the shank, and a stem which extends through the shell and has a stem head contacting the tail end face of the shank, the shell shank having an increased outside diameter in its tail end region, the material in said tail end region being harder than the material of the shank in that shank region adjacent said preformed radially enlarged head.

2. A blind rivet according to claim 1, in which there is a hard zone intermediate the increased outside diameter tail end region and said shank region adjacent said preformed radially enlarged head, said hard zone being harder than the increased outside diameter tail end region of said shell shank.

3. A blind rivet according to claim 1 in which the diameter of the stem head is identical with the diameter of the tail end region of the shell shank.

4. A blind rivet according to claim 1, in which there is provided at least one region of reduced diameter on the stem shank.

5. A blind rivet according to claim 1 further including a breakneck formed in the stem shank.

6. A self-plugging blind rivet for securing together apertured members, the rivet comprising a tubular shell having a shank, a tail end face at one end of the shank and a preformed radially enlarged head at the other end of the shank, and a stem which extends through the shall and has a stem head adjacent the tail end face of the shank, in which the shell shank has a tail end region of increased outside diameter, the increase in diameter having been achieved by axially compresing the shall shank so that the material in this region is harder than the material of the shank in a region adjacent to the preformed radially enlarged head.

* * * * *

UNITED STATES PATENT AND TRADEMARK OFFICE
CERTIFICATE OF CORRECTION

PATENT NO. : 4,988,247

DATED : January 29, 1991

INVENTOR(S) : Frederick A. Summerlin

It is certified that error appears in the above-identified patent and that said Letters Patent is hereby corrected as shown below:

Substitute the attached Figure 3 for that printed in the patent.

In the claims:

Claim 6 (Column 6, Line 26) "shall" should read --- shell ---

Claim 6 (Column 6, Line 29) "compresing the shall" should read --- compressing the shell ---

Signed and Sealed this

Seventh Day of April, 1992

Attest:

HARRY F. MANBECK, JR.

*Attesting Officer*  *Commissioner of Patents and Trademarks*